United States Patent
Skar et al.

(10) Patent No.: US 6,632,884 B1
(45) Date of Patent: Oct. 14, 2003

(54) POLYMER COMPOSITION, A PROCESS FOR THE PRODUCTION THEREOF AND FILMS PREPARED THEREOF

(75) Inventors: Merete Skar, Stathelle (NO); Ole Jan Myhre, Pregarten (AT); Arja Lehtinen, Helsinki (FI); Harri Hokkanen, Helsinki (FI); Hilkka Knuuttila, Porvoo (FI); Kalle Kallio, Porvoo (FI); Esa Kinnunen, Porvoo (FI); Eija Lappi, Porvoo (FI)

(73) Assignee: Borealis Technology Oy, Porvoo (FI)

( * ) Notice: Subject to any disclaimer, the term of this patent is extended or adjusted under 35 U.S.C. 154(b) by 0 days.

(21) Appl. No.: 09/857,901

(22) PCT Filed: Jan. 4, 2000

(86) PCT No.: PCT/FI00/00005

§ 371 (c)(1),
(2), (4) Date: Oct. 1, 2001

(87) PCT Pub. No.: WO00/40620

PCT Pub. Date: Jul. 13, 2000

(30) Foreign Application Priority Data

Jan. 4, 1999 (FI) .................................................. 990003

(51) Int. Cl.$^7$ ........................ C08F 20/02; C08L 23/00; C08L 23/04
(52) U.S. Cl. ........................................ 525/191; 525/240
(58) Field of Search .................................. 525/191, 240

(56) References Cited

U.S. PATENT DOCUMENTS 6,346,575 B1 * 2/2002 Debras et al. ............... 525/191

FOREIGN PATENT DOCUMENTS

| EP | 0447035 A2 | 9/1991 |
| EP | 0605952 A3 | 11/1993 |
| EP | 0691353 A1 | 10/1996 |
| EP | 0691367 A1 | 10/1996 |
| EP | 0881237 A1 | 2/1998 |
| WO | WO9618662 | 6/1996 |

* cited by examiner

Primary Examiner—Nathan M. Nutter
(74) Attorney, Agent, or Firm—Birch, Stewart, Kolasch & Birch, LLP (57) ABSTRACT

This invention concerns process for producing polyethylene compositions, films prepared thereof and process for the preparation of the films. The process comprises subjecting ethylene, optionally hydrogen and comonomers to polymerization or copolymerization reactions in a multistage polymerization. At least one polymerization stage is conducted essentially in the absence of hydrogen. The polymerization reactions are carried out in the presence of a single-site catalyst capable of forming a composition comprising a low molecular weight component with $MFR_2$ of at least 10 g/10 min and a density higher than the density of the composition and a high molecular weight component. The melt flow rate of the composition is in the range $MFR_2=0.1–5.0$ g/10 min and the density of the composition is 915–960 kg/m$^3$. The invention makes it possible to produce polyethylene compositions for manufacturing films with a good balance between optical and mechanical properties.

13 Claims, 1 Drawing Sheet

POLYMER COMPOSITION, A PROCESS FOR THE PRODUCTION THEREOF AND FILMS PREPARED THEREOF

This application is the national phase under 35 U.S.C. §371 of PCT International Application No. PCT/FI00/00005 which has an International filing date of Jan. 4, 2001, which designated the United States of America and was published in English.

BACKGROUND OF THE INVENTION

1. Field of the Invention

The present invention concerns a process for the production of polymer compositions. In addition, the present invention concerns films prepared of bimodal polymer compositions obtained by the present process. In particular, the present invention relates to bimodal films having an improved balance between the optical and mechanical properties and a good processability.

2. Description of Related Art

The processability on a film blowing line as well as the physical properties of the final film depend largely on the polymer structure, especially on the molecular weight distribution (MWD). If the polymer is bimodal, i.e., if the MWD is broad, the polymer can be expected to exhibit a good processability. Other important properties, which naturally depend on the application the polymer material is used in, comprise optical properties (i.e., the film should be clear and glossy) and mechanical properties.

Conventionally, linear low density polyethylene (PE-LLD) having a bimodal molecular weight distribution is produced by polymerization in the presence of Ziegler catalysts in two cascaded reactors. Similarly, high density polyethylene (PE-HD) having a bimodal MWD has been produced by polymerization in the presence of Ziegler catalysts in two reactors in series.

Medium density polyethylene (PE-MD) for blown film is typically supplied by unimodal Cr-based products. These materials are extensively used in coextruded films as a stiffness-improvement, but give relatively less contribution to other physical properties like impact required by packaging.

The use of a metallocene catalyst in a two-stage polymerization process is known from EP-A-447035 and EP-A-881237. Bimodal polyethylene for film is known from e.g. EP-A-605952, EP-A-691353. EP-A-691367 and WO-A-9618662.

EP-A-447035 discloses an ethylene polymer composition having a density of 860–940 kg/m³ and an intrinsic viscosity of 1–6 dl/g, which would mean with a rough calculation a $MFR_2$ in a range of approximately 0,04–60 g/10 min. The composition has been produced using a catalyst comprising a ligand that has a cycloalkadienyl skeleton and an organoaluminum oxy-compound. The publication refers to the reduced fraction of polymer soluble in n-decane in the resins produced according to the invention. It further states that when the fraction of such polymer is low the polymer has excellent anti-blocking properties.

In addition, the publication states that the target has been to produce materials having the clarity of the unimodal metallocene-based resin but a superior processability. The publication does not, however, disclose whether or not the good clarity and improved processability actually were achieved. The melt flow rate region disclosed in the publication is considerably large, which seems to indicate that it was not clear what combination of density and intrinsic viscosity would result in best processability and best clarity. Comparative examples shall show that many materials satisfying the definitions of EP-A447035 are not appropriate for producing films with a good combination of optical and mechanical properties.

EP-A-605952 discloses a polymer composition comprising two different ethylene polymers, which have been obtained by using a catalyst comprising at least two different metallocene compounds. This type of catalyst is sometimes referred to as dual site catalyst. The publication discloses that the two ethylene polymers may be polymerized separately and blended in an extruder, or the polymers may be dissolved and then combined. The polymers may also be produced in a two stage polymerization. The composition can be used to prepare films.

The examples show that the compositions where a dual site catalyst was used to prepare the polymer components produced films with good optical properties, high impact strength and good processability (or mouldability). Comparative examples 1 and 2 further disclose that compositions where a single component catalyst was used to prepare the polymer components, produced films with inferior optical and mechanical properties and poor processability.

EP-A-881237 discloses a two-stage process to produce ethylene polymers, wherein a metallocene catalyst based on a tetrahydroindenyl compound was used in a two-stage polymerization process. The document further discloses that the density of the polymer may range from 900 to 970 kg/m³ and the high load melt index ($MFR_{21}$) from 0.1 to 45000 g/10 min. The examples disclose that the polymer was produced in loop and CSTR reactors. The materials disclosed in the examples had a density between 938 and 955 kg/M³ and a melt index $MFR_2$ between 0.18 and 1.2 g/10 min. The use of the polymer was not disclosed and no practical examples concerning the use of the polymer were given.

EP-A-691367 discloses a film extruded from an in-situ blend of ethylene polymers prepared using Ziegler-Natta catalysts. The publication states that the resulting resins have a high mechanical strength. It is also stated in the publication that the film has a good processability and a low blocking tendency. The optical properties or gel level are not referred to. It is, however, known in the art that films made of such blends tend to be hazy.

EP-A-691353 discloses a process for preparing an in-situ blend giving a low gel level film. The process comprises polymerizing ethylene (with comonomer) in a cascade of gas phase reactors using a Ziegler-Natta catalyst. The publication further discloses that the resulting material has a good processability in blown film line.

WO-A-9618662 discloses a process for producing both high density and linear low density film material. The process comprises a cascade of a loop and a gas phase reactor. In the process, also a prepolymerizer is included.

The publication also states that metallocene catalysts may be used in the process. However, it does not reveal the purpose for using a metallocene catalyst nor the advantages of it.

Thus, as apparent from the above, the available materials for films give limited alternatives in terms of a balance between clarity and mechanical properties.

SUMMARY OF THE INVENTION

It is an object of the present invention to provide an improved process for producing suitable polyethylene materials for the production of films.

It is another object of the present invention to provide novel polymer compositions for film-making.

It is a further object of the present invention to eliminate the problems of the prior art and to provide novel polymer films.

These and other objects, together with the advantages thereof over known processes and products, which shall become apparent from the specification which follows, are accomplished by the invention as hereinafter described and claimed.

The present invention is based on the provision of bimodal polyethylene compositions comprising a first (low molecular weight) component with $MFR_2$ at least 10 g/10 min and a density higher than the density of the composition, at least one other component, said composition having a melt flow rate in the range $MFR_2$=0.1–5.0 g/10 min and a density of 905–960 kg/m$^3$.

According to one embodiment, the present invention provides a bimodal polyethylene compositions comprising a first (low molecular weight) component with $MFR_2$ at least 10 g/10 min and a density higher than the density of the composition, at least one other component, said composition having a melt flow rate in the range $MFR_2$=0.1–5.0 g/10 min and a density of 915–960 kg/m$^3$.

The composition is further characterized by a shear thinning index (SHI) of 3–20, viscosity of 5000–25000 Pas and storage modulus $G'_{5kPa}$ of 800–2500 Pa. It can be used for manufacturing polyethyiene films. The films according to the invention exhibit excellent balance between optical and mechanical properties.

The composition for polyethylene films can be produced by polymerizing or copolymerizing ethylene in a reactor cascade formed by at least two reactors in the presence of a metallocene catalyst capable of producing a high molecular weight polymer in the absence of hydrogen. The problem in using metallocene catalysts in the production of bimodal polyethylene has been that either they have not been able to produce a high enough molecular weight necessary in this kind of a process or their activity is too low to ensure an economic operation of such a process. Especially difficult has been to activate hafnium metal containing metallocene catalysts on a carrier. Now it has surprisingly been found that the catalysts according to the present invention, which are described in detail later on, are able to fulfil all the objectives and thus are suitable for the production of bimodal polyethylene in a process involving heterogeneous catalysis.

More specifically, the process according to the present invention is mainly characterised by what is stated in the characterising part of claim 1.

The present film-making process is characterised by what is stated in the characterising part of claim 13.

The present polyethylene film is characterised by what is stated in the characterising part of claim 18.

Considerable advantages are obtained by means of the present invention. The present process enables the preparation of resins having good optical properties (high gloss), processability similar to existing Ziegler-Natta materials and superior to that of unimodal metallocene materials (higher shear thinning index) and mechanical properties which are comparable to existing commercial materials (puncture, elongation) by using a metallocene catalyst.

The novel composition for films may be used for producing both blown and cast films. It is, however, particularly suitable for film blowing, with the improved optical properties.

The particular advantage of applying the invention in high density film production is that a material with very good optical properties can be obtained. This has not been possible using conventional methods which produce hazy films. Still, as will later be shown in the examples, the mechanical properties are on a good level.

Medium density films having a density range between 930–940 kg/m$^3$ and a good clarity can be produced using conventional methods also. However, the invention allows for the combination of the good optical properties with good mechanical properties and a good processability.

As in medium density area, also in the low density area films having good optical properties have been known. But again, the combination of good optical properties and good mechanical properties is a new feature.

Next, the invention will be more closely examined with the aid of the following detailed description and with reference to the attached drawings.

DETAILED DESCRIPTION OF THE INVENTION

Definitions

For the purpose of the present invention, "slurry reactor" designates any reactor operating in slurry, in which reactor the polymer forms in particulate form. As examples of suitable reactors can be mentioned a continuous stirred tank reactor, a batch-wise operating stirred tank reactor or a loop reactor. According to a preferred embodiment the slurry reactor comprises a loop reactor.

By "gas phase reactor" is meant any mechanically mixed or fluidized bed reactor. Preferably the gas phase reactor comprises a mechanically agitated fluidized bed reactor with gas velocities of at least 0.2 m/sec.

By "melt flow rate" or abbreviated "MFR" is meant the weight of a polymer extruded through a standard cylindrical die at a standard temperature in a laboratory rheometer carrying a standard piston and load. MFR is a measure of the melt viscosity of a polymer and hence also of its molecular weight. The abbreviation "MFR" is generally provided with a numerical subindex indicating the load of the piston in the test. Thus, e.g., MFR$_2$ designates a 2.16 kg load. MFR can be determined using, e.g., by one of the following tests: ISO 1133 C4, ASTM D 1238 and DIN 53735.

In the present invention, the rheological properties of polymers have been determined using Rheometrics RDA II Dynamic Rheometer. The measurements have been carried out at 190° C. under nitrogen atmosphere. The measurements give storage modulus (G') and loss modulus (G") together with an absolute value of complex viscosity ($\eta^*$) as a function of frequency ($\omega$) or absolute value of complex modulus (G*).

$$\eta^* = \sqrt{(G'^2 + G''^2)}/\omega$$

$$G^* = \sqrt{(G'^2 + G''^2)}$$

According to Cox-Merz rule the complex viscosity function, $\eta^*(\omega)$ is the same as conventional viscosity function (i.e., viscosity as a function of shear rate), if frequency is expressed in rad/s. If this empiric equation is valid, then the absolute value of complex modulus corresponds to shear stress in conventional (i.e., steady state) viscosity measurements. It can thus be concluded that also the function $\eta^*(G^*)$ accounts for viscosity as a function of shear stress.

In the present method, viscosily at a low shear stress or $\eta^*$ at a low G* (which serve as an approximation of zero viscosity), is used as a measure of average molecular weight. On the other hand, shear thinning, i.e. the decrease of viscosity with G*, gets the more pronounced the broader the molecular weight distribution is. This property can be approximated by defining a shear thinning index. SHI, as a ratio of viscosities at two different shear stresses. In the examples below the shear stresses (or G*) of 0 and 100 kPa have been used. Thus:

$$SHI_{0/100} = \eta^*_0 / \eta^*_{100}$$

where $\eta^*_0$ is the zero shear rate viscosity $\eta^*_{100}$ is complex viscosity at G*=100 kPa As already mentioned, the storage modulus function, G'($\omega$), and the loss modulus function, G"($\omega$), are obtained as primary functions from dynamic measurements. The value of the storage modulus at a specific value of loss modulus increases with the broadness of molecular weight distribution. However, this quantity is highly dependent on the shape of the molecular weight distribution of the polymer. In the examples a value of G' at G"=5 kPa is used.

It should be noted that the viscosity, shear thinning index and storage modulus values are used as measures of average molecular weight and molecular weight distribution. The reason for using these values obtained from rheology, rather than the values of molecular weights and molecular weight distribution obtained directly from size exclusion chromatography, is that the size exclusion chromatography can be relatively insensitive to the high molecular weight end of the molecular weight distribution. The information of this high molecular weight end is important, however, because the processability of the polymer and many properties, like mechanical and optical properties are significantly influenced by the high molecular weight end. Rheology, on the other hand, is sensitive to the high molecular weight end of the molecular weight distribution, and for this reason rheology was used to characterise the polymer.

Melt fracture is detected in the polymer film as small, repeated bands which occur continuously and affect the optical properties of the film. In defining the degree of melt fracture, terms "yes", "some". "slight", "very slight", "no" are used. If the grade of melt fracture is "yes", then the bands are clearly visible, and the film is no longer transparent. If there is "no" melt fracture then, as is obvious, the material does not exhibit such feature at all. In the case of "some", "slight" and "very slight", "some" means that the melt fracture is visible and hinders the transparency a little, "slight" means that the melt fracture is somewhat visible but does not affect the optical properties of the material and "very slight" means that the melt fracture can hardly be seen. Of these grades "some", "slight" and "very slight" can be classified as non-significant amount of melt fracture.

POLYMERIZATION PROCESS

To produce the polymer compositions according to the invention, ethylene is polymerized in the presence of a metallocene catalyst at elevated temperature and pressure. Polymerization is carried out in a series of polymerization reactors selected from the group of slurry and gas phase reactors. In the following, the reactor system comprises one loop reactor (referred to as "the first reactor") and one gas phase reactor (referred to as "the second reactor"), in that order.

However, it should be understood that the reactor system can comprise the reactors in any number and order. It is also possible to conduct the process in two or more gas phase reactors.

The high molecular weight portion and the low or medium molecular weight portion of the product can be prepared in any order in the reactors. A separation stage is normally needed between the reactors to prevent the carry-over of reactants from the first polymerization stage into the second one. The first stage is typically carried out using an inert reaction medium.

The catalyst used in the polymerization process is a single site catalyst. According to a preferred embodiment, no fresh catalyst is added to the second polymerization stage. The catalyst should produce a relatively narrow molecular weight distribution and comonomer distribution. Additionally, a very important feature of the catalyst is that it should be able to produce a high enough molecular weight so that good mechanical properties and good processability are obtained. Thus, the catalyst should be able to produce a weight average molecular weight of at least 250000 g/mol, preferably at least 300000 g/mol at the conditions present in the polymerization stage where the high molecular weight component is produced. Some metallocene catalysts, like those based on a bis-(n-butyl cyclopentadienyl)zirconium dichloride complex and disclosed in FI-A-934917 are not able to produce a high enough molecular weight polyethylene and their usefulness in bimodal polymerization is limited. An example of this is shown in EP-A-605952, where a similar type of catalyst was used in a two-stage polymerization process in Comparative Examples 1 and 2, and bimodal resins having poor processability were obtained. It has been found that some metallocene catalysts are able to produce a high enough molecular weight. One example of such catalysts is the one disclosed in FI-A-934917 and which is based on the complex having the general formula wherein
X$_1$ and X$_2$ are either same or different and are selected from a group containing halogen, methyl, benzyl, amido or hydrogen,
Hf is hafnium,
Cp is a cyclopentadienyl group, and
R$_1$ and R$_2$ are either the same or different and are either linear or branched hydrocarbyl groups containing 1–10 carbon atoms.

According to one embodiment of the present invention, a catalyst based on an active complex having the above formula is used. According to this embodiment, however, X$_1$ and X$_2$ are either same or different and are selected from a group containing halogen, methyl, benzyl or hydrogen. The other species in the formula are as defined above.

Especially suitable complexes of the kind described above are bis-(n-butyl cyclopentadienyl) hafnium dihalides.

Another group of suitable complexes are the siloxy-substituted bridged bis-indenyl zirconium dihalides, which are disclosed in FI-A-960437.

According to one embodiment of the invention, X$_1$ and X$_2$ are selected so that one of them is halogen, preferably chlorine, and the other is a methyl, amido or benzyl group or a hydrogen atom, preferably an amido group. For example, in the dihalide complexes described above, it is possible to replace one of the halogens by a methyl, amido or benzyl group or by a hydrogen atom. One example is thus a catalyst having an active complex containing chlorine and an amido group.

These catalysts are typically supported on a solid carrier, but they may also be used as unsupported. The carrier is typically inorganic, and suitable materials comprise, e.g., silica (preferred), silica-alumina, alumina, magnesium oxide, titanium oxide, zirconium oxide and magnesium silicate (cf. also FI-A-934917). The catalysts are normally used together with an aluminumoxane cocatalyst. Suitable cocatalysts are, e.g., methylaluminumoxane (MAO), tetraisobutylaluminumoxane (TIBAO) and hexaisobutylaluminumoxane (HIBAO). The cocatalyst is preferably supported on the carrier, typically together with the catalyst complex, although the cocatalyst may optionally be fed into the reactor separately.

A catalyst based on bis-(n-butyl cyclopentadienyl) hafnium dihalide complex supported on a silica or a silica-alumina carrier together with a methylaluminoxane cocatalyst is suitable to be run in a process including a loop rector and a gas phase reactor. Especially suitable is a catalyst based on bis-(n-butyl cyclopentadienyl) hafnium dichloride. Both the complex and the cocatalyst are supported on the carrier. The thus obtained catalyst is then fed into the reactor. The catalyst is easy to feed and the polymer settles well in the loop reactor. This makes the loop reactor operation easy. In the gas phase reactor the catalyst is able to produce a sufficiently high molecular weight material. This is essential to obtain the required processability on the film line and good mechanical properties of the film.

In every polymerization step it is possible to use also comonomers selected from the group of C$_{3-18}$ olefins, preferably C$_{4-10}$ olefins, such as 1-butene, 1-pentene, 1-hexene, 4-methyl-1-pentene, 1-heptene, 1-octene, 1-nonene and 1-decene as well as mixtures thereof and dienes, such as 1.5-hexadiene and 1,9-decadiene.

In addition to the actual polymerization reactors used for producing the bimodal ethylene homo- or copolymer, the polymerization reaction system can also include a number of additional reactors, such as prereactors. The prereactors include any reactor for prepolymerizing the catalyst and for modifying the olefinic feed, if necessary. All reactors of the reactor system are preferably arranged in series (in a cascade).

The polymerization steps may be performed in the most convenient order. Thus, it is possible to polymerize the low molecular weight component in the first step of the process and the high molecular weight component in the second step. It is also possible to perform the steps in a reversed order, i.e., to polymerize the high molecular weight component in the first stage and the low molecular weight component in the second stage. If the first stage involves a slurry polymerization, it is preferred to produce the low molecular weight component in that stage to avoid problems due to the solubility of the polymer.

According to a preferred embodiment of the invention, the polymerization comprises the steps of subjecting ethylene and, optionally, hydrogen and comonomers to a first polymerization or copolymerization reaction in the presence of a single-site catalyst in a first reaction zone or reactor to produce a polymer having a MFR of 10 g/10 min or more, recovering the first polymerization product from the first reaction zone, feeding the first polymerization product to a second reaction zone or reactor, feeding additional ethylene and, optionally, comonomers to the second reaction zone, subjecting the additional ethylene and optionally additional monomer(s) and/or hydrogen to a second polymerization reaction in the presence of the single-site catalyst and the first polymerization product to produce a second polymerization product having a MFR$_2$ of less than 5 g/10 min, and recovering the combined polymerization product from the second reaction zone.

In the first step of the process, ethylene with the optional comonomer(s) is fed into the first polymerization reactor. Along with these components is fed also hydrogen which functions as a molecular weight regulator. The amount of hydrogen depends on the desired molecular weight of the polymer. The catalyst may be fed to the reactor together with the reagents or, preferably, by flushing with a diluent.

The polymerization medium typically comprises the monomer (i.e. ethylene) and/or a hydrocarbon, in particular, a light inert hydrocarbon such as propane, iso-butane, n-butane or isopentane. The fluid is either liquid or gaseous. In the case of a slurry reactor, in particular a loop reactor, the fluid is liquid and the suspension of polymer is circulated continuously through the slurry reactor, whereby more suspension of polymer in particle form in a hydrocarbon medium or monomer will be produced.

The conditions of the slurry reactor are selected so that 30–70 wt-%, preferably 40–60 wt-%, of the whole production is polymerized in the slurry reactor(s). The temperature is in the range of 40 to 110° C., preferably in the range of 70 to 100° C. The reaction pressure is in the range of 25 to 100 bar, preferably 35 to 80 bar and the mole fraction of ethylene in the reaction mixture is typically 3–10% by mole. In order to produce a polyethylene having a density in excess of 960 kg/m$^3$, the polymerization is preferably carried out at supercritical conditions at temperatures over 90° C. In slurry polymerization more than one reactor can be used in series. In such a case the polymer suspension in a reaction medium produced in the slurry reactor is fed without separation of inert components and monomers periodically or continuously to the following slurry reactor, which acts at lower pressure than the previous slurry reactor.

The polymerization heat is removed by cooling the reactor with a cooling jacket. The residence time in the slurry reactor must be at least 10 minutes, preferably 20–100 min for obtaining a sufficient degree of polymerization.

As discussed above, if a low molecular weight polyethylene is the desired product, hydrogen is fed into the reactor. With a catalyst according to the invention, a very small amount of hydrogen is sufficient to produce a high MFR$_2$ polyethylene. Thus, an MFR$_2$ of 50–300 g/10 min can be obtained with a hydrogen-to-ethylene feed ratio between 0.1–0.5 kg of hydrogen/ton of ethylene. The hydrogen is typically consumed in the reactor, so that it cannot be detected by analysis, e.g., by gas chromatography or only small amount of hydrogen is present in the reaction mixture. Typically the molar ratio of hydrogen to ethylene is between 0.4 and 1 mol/kmol, or 400–1000 ppm by volume.

After the first reaction zone the volatile components of the reaction medium are evaporated. As a result of the evaporation, hydrogen is removed from the product stream. The stream can be subjected to a second polymerization in the presence of additional ethylene to produce a high molecular weight polymer.

The second reactor is preferably a Pas phase reactor, wherein ethylene and preferably comonomers are polymerized in a gaseous reaction medium in the presence of a single-site catalyst. If it is desirable to obtain a high molecular weight polymer, the polymerization is conducted essentially in the absence of hydrogen. The expression "essentially in the absence of hydrogen" means, for the purposes of this invention, that no additional hydrogen is fed to the reactor and the amount of hydrogen present in the reactor is typically less than 0.4 mol/kmol (400 ppm by volume), preferably less than 0.3 mol/kmol (300 ppm by volume). According to one embodiment of the invention the amount of hydrogen is so small that it cannot be detected with analytical equipment commonly used in this kind of application, e.g., gas chromatograph. The gas phase reactor can be an ordinary fluidized bed reactor, although other types of gas phase reactors can be used. In a fluidized bed reactor, the bed consists of the formed and growing polymer particles as well as still active catalyst come along with the polymer fraction. The bed is kept in a fluidized state by introducing gaseous components, for instance monomer and optionally comonomer(s) on such a flow rate that will make the particles act as a fluid. The fluidizing gas can contain also inert carrier gases, like nitrogen and propane and also hydrogen as a molecular weight modifier. The fluidized gas phase reactor can be equipped with a mechanical mixer.

The gas phase reactor used can be operated in the temperature range of 50 to 115° C., preferably between 60 and 110° C. and the reaction pressure between 10 and 40 bar and the partial pressure of ethylene between 1 and 20 bar, preferably 5–10 bar.

The production split between the high molecular weight polymerization reactor and the low molecular weight polymerization reactor is 30–70:70–30. Preferably, 30 to 70 wt-%, in particular 40 to 60%, of the ethylene homopolymer or copolymer is produced at conditions to provide a polymer having a MFR$_2$ of 10 g/10 min or more and constituting the low molecular weight portion of the polymer, and 70 to 30 wt-%, in particular 60 to 40 wt-%, of the ethylene homopolymer or preferably copolymer is produced at conditions to provide a polymer having a MFR$_2$ of less than 5 g/10 min, in particular about 0.4 to 5 g/10 min and constituting the high molecular weight portion of the polymer. The density of the low molecular weight portion is preferably 940–975 kg/m$^3$ and the density of the final polymer is preferably 915 to 960 kg/m$^3$.

The present polymers and copolymers of ethylene can be blended and optionally compounded with additives and adjuvants conventionally used in the art. Thus, suitable additives include antistatic agents, flame retardants, light and heat stabilizers, pigments, processing aids and carbon black. Fillers such as chalk, talc and mica can also be used. Note, however, that while processing aids, such as fluoroelastomers, can be added to the polymer composition, they are not needed to ensure a good processability. The compositions according to the present invention can easily be processed to a film without the addition of processing aids.

THE POLYMER COMPOSITION

The present invention concerns also polyethylene compositions having a bimodal molecular weight distribution and comprising a high molecular weight portion and a low molecular weight portion. The MFR$_2$ of the low molecular weight portion of the composition is at least 10 g/10 min and the density of the low molecular weight portion is higher than the density of the composition.

The polyethylene composition comprises, according to the invention, 30 to 70 wt-%, preferably 40 to 60 wt-% of a high molecular weight portion, and 70 to 30 wt-%, preferably 60 to 40 wt-% of a low molecular weight portion. The melt flow rate the composition is in the range from about MFR$_2$=0.1–5.0 g/10 min, preferably 0.4–3.0 g/10 min.

According to one embodiment of the invention 30 to 70 wt-%, in particular 40 to 60 wt-% of the composition is formed of an ethylene polymer having a MFR$_2$ of 10 g/10 min or more and 70 to 30 wt-%, in particular 60 to 40 wt-%, of the composition is formed of an polymer having a MFR$_2$ of less than 5 g/10 min.

The density of the polymer product is about 905 to 960 kg/m$^3$, in particular 915 to 960 kg/m$^3$. The composition is further characterized by a shear thinning index (SHI$_{0/100}$) of 3–20, preferably of 3.5–15, a zero shear rate viscosity of 5000–25000 Pas, preferably of 8000–20000 Pas, and a storage modulus G'$_{5kPa}$ of 800–2500 Pa.

The density of the polymer and the density and melt flow rate of the low molecular weight component correlate preferably as presented in the following:

If the density of the composition is between 940–960 kg/m$^3$, the MFR$_2$ of the low molecular weight component is higher than 50 g/10 min, preferably between 50–1000 g/10 min and the density is higher than 965 kg/m$^3$.

If the density of the composition is in the medium density area, i.e., between 930–940 kg/m$^3$, the low molecular weight component preferably has an MFR$_2$ between 20–1000 g/10 min and a density between 940–975 kg/m$^3$.

If the density of the composition is low, between 905–930 kg/m$^3$, in particular 915–930 kg/m$^3$ the low molecular weight component preferably has an MFR$_2$ between 10–500 g/10 min and density between 925–965 kg/m$^3$, in particular 935–965 kg/m$^3$.

As specific examples of preferred embodiments, the following is presented:

A composition with a melt flow rate MFR$_2$ lower than 5 g/10 min, density of 940–960 kg/m$^3$, a zero shear rate viscosity of 5000–21 000 Pas, shear thinning index (SHI$_{0/100}$) of 5–20 and a storage modulus G'$_{5kPa}$ of 1000–2500 Pa.

A composition with a melt flow rate MFR$_2$ lower than 5 g/10 min, a density of 930–940 kg/m$^3$, a zero shear rate viscosity of 5000–25000 Pas, shear thinning index (SHI$_{0/100}$) of 3–15 and storage modulus G'$_{5kPa}$ of 800–2100 Pa.

A composition with a melt flow rate MFR$_2$ in the range of 0.4–5 g/10 min, a density of 915–930 kg/m$^3$, a zero shear rate viscosity of 8000–20000 Pas, shear thinning index (SHI$_{0/100}$) of 5–20 and a storage modulus G'$_{5kPa}$ of 800–2000 Pa.

A composition with a melt flow rate MFR$_2$ in the range of 0.4–5 g/10 min, a density of 905–930 kg/m$^3$, a zero shear rate viscosity of 8000–20000 Pas, shear thinning index (SHI$_{0/100}$) of 3–20 and a storage modulus G'$_{5kPa}$ of 800–2000 Pa.

Due to the good mechanical properties in combination with excellent optical properties, the present polyethylene compositions can be blown or extruded to films. The composition is particularly suitable for film blowing. The polymer is fed, typically in the form of powder or pellets, optionally together with additives, to a film blowing or extruding device.

According to one embodiment of the invention the film exhibiting the optical and mechanical properties described below is produced by blowing or extruding a polymer composition comprising a low molecular weight component with MFR$_2$ of at least 10 g/10 min and a density higher than the density of the composition, a high molecular weight component, said composition having a melt flow rate in the range MFR$_2$=0.1–5.0 g/10 min, a density of 905–960 kg/m$^3$, a zero shear rate viscosity of 5000–25000 Pas, shear thinning index (SHI) of 3–20 and a storage modulus G'$_{5kPa}$ of 800–2500 Pa.

According to another embodiment of the invention the film exhibiting the optical and mechanical properties described below is produced by blowing or extruding a polymer composition comprising a low molecular weight component with MFR$_2$ of at least 10 g/10 min and a density higher than the density of the composition, a high molecular weight component, said composition having a melt flow rate in the range MFR$_2$=0.1–5.0 g/10 min, a density of 915–960 kg/m$^3$, a zero shear rate viscosity of 5000–25000 Pas, shear thinning index (SHI) of 3–20 and a storage modulus G'$_{5kPa}$ of 800–2500 Pa.

The thickness of the film is about 10–300 µm, preferably 20–100 µm, more preferably 30–100 µm and in particular 30–80 µm. The films produced generally exhibit the following features:

haze less than 20% gloss higher than 70% dart drop higher than 150 g, and non-significant melt fracture.

Thus, the film is glossy, clear and very well processable. Preferably, the gloss is higher than 80% and the film exhibits haze less than 15%. The non-significant melt fracture means that although traces of melt fracture may be detected in the film, it does not disturb the visual appearance of the film. What is more, the absence of melt fracture has been obtained without adding processing aid additives, such as fluoroelastomers, to the polymer.

The present polyethylene compositions can also be used to produce heat sealable films, since compositions combine the excellent sealing properties of unimodal metallocene based materials with the processability of the Ziegler materials.

Description of Analytical Methods

Laboratory Polymerization

Polymerization in a laboratory reactor is carried out as follows.

The first stage (slurry) is carried out using isobutane as a medium. The second stage (gas phase) is run as a stirred bed technique in a semibatch mode after the evaporation of the medium by the same reactor as at the first stage.

Bimodal metallocene PE materials are produced using two stage polymerization technique. Two different catalysts are employed in the polymerizations. In the first stage slurry polymerization low molecular weight PE having controlled MFR and density is made. This is done by continuous hydrogen and 1-hexene introduction to the reactor. In the second stage (gas phase) high molecular weight portion is made by controlling the density values of the end composition with 1-hexene addition. The MFR is held constant because hydrogen was not present. In both stages the hydrogen/ethylene ratios are calculated as mol/kmol.

It is also possible to feed the materials first to a pre-mixing chamber, PMC. In the PMC the materials are mixed continuously with, e.g., a paddle stirrer. The feed of the first reactor can also consist of the reaction mixture from a previous reactor, if any, together with added fresh monomer, optional hydrogen and/or comonomer and additional catalyst.

The polymerization temperature is 80° C. in both stages. The partial pressure of ethylene is 56–6.0 bar in the slurry polymerization and 5–10 bar in the gas phase polymerization.

The polymerization rate is followed by recording the ethylene consumption. This is also used in determination of the split (ratio between high molecular eight and low molecular weight materials).

After the polymerization is completed, the polymer is recovered, dried and analysed.

Laboratory Material Compounding

Powder was fed first to the compounding unit, which was a twin screw Brabender DSK42/7, screw diameter D=42 mm and screw length/diameter ratio L/D=7. Nominal output range of this unit was 1200–4800 g/h, but it has been running succesfully at 500 g/h. Screws were counter rotated.

After the compounding unit the polymer melt was fed to the extrusion unit, which was Brabender single screw extruder, D=19 mm and L/D=25. Feed was connected to the gas ventilation point of the extruder, located so that 40% of extruder screw length was filled, i.e. in effective use. Extruder generated enough pressure for 100 mm cast film extrusion.

Gloss

Gloss is measured according to ASTM D 2457v.

Haze

Haze is measured according to ASTM 1003.

Dart Drop

Dart drop is measured using ISO 7765-1 method.

Puncture

A simple small scale puncture test is introduced. The film is mechanically clamped allowing circular testing area of diameter 50 mm. The film is then punctured by a striker (diameter 20 mm). The force and travel to puncturing point are measured and the required energy is calculated. Travelling speed of the striker is 200 mm/min.

Tensile Strength

The experiment is performed according to ISO 1184 method. The specimen is extended along its major axis at a constant speed. Normal 50 mm could be used as a distance between grips (gauge length) in film tensile testing. 125 mm gauge length would be required for tensile modulus measurement so this was not possible for 100 mm cast film in transverse direction.

Tear Strength

Tear testing, is done according to ASTM 1922. Machine direction is easier, as the thickness variation in critical test direction is better controlled. Thickness varied more in transverse direction and occasionally difficulties arise in taking the sample in a manner which guarantees an even thickness for the critical testing area.

The invention is further illustrated with the aid of the following examples.

EXAMPLE 1

168 g of metallocene complex (bridged siloxy-substituted bis-indenyl zirconium dichloride, according to a patent application FI 960437) and 9. 67 kg of a 30% MAO solution supplied by Albemarle were combined and 3.18 kg dry, purified toluene was added. The thus obtained complex solution was added on 9 kg silica carrier SP9-243 by Grace having average particle size of 20 microns, pore volume of 1.5–1.7 $mm^3$ and specific surface area of 350–400 $m^2/g$. The complex was fed very slowly with uniform spraying during 2 hours. Temperature was kept below 30° C. The mixture was allowed to react for 2 h after complex addition at 30° C.

The thus obtained catalyst was dried under nitrogen for 6 h at 75° C. temperature. After nitrogen drying the catalyst was further dried under vacuum for 10 h.

This catalyst is referred to as catalyst A in the subsequent examples.

EXAMPLE 2

134 g of a metallocene complex (TA02823 by Witco, n-butyl dicyclopentadienyl hafnium dichloride containing 0.36% by weight Hf) and 9.67 kg of a 30% MAO solution supplied by Albemarle were combined and 3.18 kg dry, purified toluene was added. The thus obtained complex solution was added on 17 kg silica carrier Sylopol 55 SJ by Grace. The complex was fed very slowly with uniform spraying during 2 hours. Temperature was kept below 30° C. The mixture was allowed to react for 3 h after complex addition at 30° C.

The thus obtained catalyst was dried under nitrogen for 6 h at 75° C. temperature. After nitrogen drying the catalyst was further dried under vacuum for 10 h.

This catalyst is referred to as catalyst B in the subsequent examples.

EXAMPLE 3

Catalyst, diluent, ethylene and optionally hydrogen and comonomer were added into a 10 $dm^3$ laboratory polymerization reactor. A two stage polymerization was performed as described above.

Polymerization runs were carried out in such conditions that materials according to samples H1–H3, M1–M6 and L1–L6 in Table 1, Table 2 and Table 3 were obtained. Split presented in the tables is given as the fraction of the polymer produced in the first stage to the fraction of polymer produced in the second stage (i.e. 40/60 means that 40% of the material has been produced in the first stage and 60% in the second stage).

The samples H2, M3, M4 and M5 were prepared in a reversed mode, i.e., the high molecular weight component was prepared in the first stage and the low molecular weight component in the second stage.

TABLE I

HD materials, lab polymerization data

| Sample | H1 | H2 | H3 | CH1 | CH2 |
|---|---|---|---|---|---|
| Catalyst | B | A | A | A | A |
| Density [kg,m³] (1st stage) | 973 | | 969 | 971 | 963 |
| MFR₂ [g/10 min] (1st stage) | 109 | | 20 | 49 | 118 |
| Density [kg/m³] | 945 | 940 | 942 | 943 | 944 |
| MFR₂ [g/10 min] | 3.5 | 0.8 | 1.2 | 13.3 | 10.3 |
| Split | 60/40 | 40/60 | 40/60 | 60/40 | 60/40 |

TABLE 2

MD materials, lab polymerization data

| Sample | M1 | M2 | M3 | M4 | M5 | M6 | CM1 | CM2 | CM3 |
|---|---|---|---|---|---|---|---|---|---|
| Catalyst | B | B | B | B | A | A | B | A | A |
| Density [kg/m$^3$] (1$^{st}$ stage) | 970 | 962 | | | 951 | 959 | 976 | | 973 |
| MFR$_2$ [g/10 min] (1$^{st}$ stage) | 25 | 261 | | | 98 | 30 | 193 | | 88 |
| Density [kg/m$^3$] | 937 | 935 | 931 | 936 | 933 | 934 | 936 | 933 | 938 |
| MFR$_2$ [g/10 min] | 0.62 | 1.2 | 1.0 | 0.41 | 3.1 | 3.4 | 0.84 | 5.6 | 10.9 |
| Split | 40/60 | 60/40 | 50/50 | 50/50 | 50/50 | 50/50 | 50/50 | 50/50 | 50/50 |

TABLE 3

LLD materials, lab polymerization data

| Sample | L1 | L2 | L3 | L4 | L5 | L6 | CL1 | CL2 | CL3 |
|---|---|---|---|---|---|---|---|---|---|
| Catalyst | B | B | B | B | A | A | A | B | B |
| Density [kg/m$^3$] (1$^{st}$ stage) | 953 | 936 | 942 | 928 | 953 | 961 | 948 | 957 | 948 |
| MFR$_2$ [g/10 min] (1$^{st}$ stage) | 20 | 15 | 172 | | 148 | 74 | 49 | 141 | 330 |
| Density [kg/m$^3$] | 928 | 921 | 929 | 928 | 927 | 929 | 926 | 922 | 923 |
| MFR$_2$ [g/10 min] | 1.2 | 1.3 | 0.68 | 0.47 | 3.4 | 3.1 | 7.8 | 0.57 | 0.33 |
| Split | 50/50 | 60/40 | 50/50 | 50/50 | 40/60 | 40/60 | 60/40 | 40/60 | 40/60 |

COMPARATIVE EXAMPLE 1

The polymerization runs were performed according to Example 3. The samples are denoted as CH1–CH2, CM1–CM3 and CL1–CL3 in Table 1, Table 2 and Table 3.

The sample CM2 was prepared in a reversed mode of operation, i.e. the high molecular weight component was produced in the first stage and the low molecular weight component in the second stage.

EXAMPLE 4

A pilot plant comprising a loop and a gas phase reactor was operated as follows: The loop reactor was operated at 85° C. temperature and 60 bar pressure. Propane, ethylene, hydrogen and 1-butene comonomer were continuously introduced into the reactor, together with the polymerization catalyst, so that polymer production rate was about 25 kg/h. Reactor conditions were such that polymer having properties according to Table 4 was produced. Polymer slurry was intermittently discharged from the reactor to a flash tank where the hydrocarbons were separated from the polymer. The polymer was introduced into a gas phase reactor, operated at 85° C. temperature and 20 bar pressure, where additional ethylene and 1-butene comonomer were added. Reactor conditions and polymer withdrawal rate were such that materials according to Table 4 were obtained.

COMPARATIVE EXAMPLE 2

The procedure of Example 4 was repeated, except that a catalyst of Ziegler-Natta type, prepared according to Example 3 of EP-A-688794 was used. The corresponding sample is denoted as CL4 in Table 4.

TABLE 4

LLD materials, pilot plant polymerization data

| Sample | L7 | L8 | L9 | L12 | L13 | L14 | L15[1)] | L16[1)] | CL4[1)] |
|---|---|---|---|---|---|---|---|---|---|
| Catalyst | B | B | B | B | A | A | A | A | Z |
| Density [kg/m$^3$] (1$^{st}$ stage) | 941 | 938 | 940 | 937 | 937 | 936 | 929 | 931 | 937 |
| MFR$_2$ [g/10 min] (1$^{st}$ stage) | 130 | 80 | 130 | 93 | 119 | 71 | 150 | 260 | 1.4 |
| Density [kg/m$^3$] | 925 | 919 | 921 | 915 | 920 | 920 | 915 | 918 | 920 |
| MFR$_2$ [g/10 min] | 0.75 | 0.42 | 0.70 | 0.82 | 1.5 | 1.5 | 1.2 | 1.4 | 1.2 |

TABLE 4-continued

LLD materials, pilot plant polymerization data

| Sample | L7 | L8 | L9 | L12 | L13 | L14 | L15[1)] | L16[1)] | CL4[1)] |
|---|---|---|---|---|---|---|---|---|---|
| Split [loop-%/gpr-%] | 40/60 | 39/61 | 45/55 | 42/58 | 49/51 | 50/50 | 48/52 | 48/52 | 51/49 |

[1)]Loop reactor operated at 75° C.

EXAMPLE 5

The materials of the Example 3 and Example 4 were analysed. The analysis data is shown in Table 5, Table 6, Table 7 and Table 8.

TABLE 5

HD lab materials, analysis data

| Material | H1 | H2 | H3 | CH1 | CH2 |
|---|---|---|---|---|---|
| Density [kg/m³] | 945 | 941 | 942 | 943 | 944 |
| MFR$_2$ [g/10 min] | 3.5 | 0.8 | 1.2 | 13.3 | 10.3 |
| $\eta_0$ [Pas] | 8260 | 20000 | 27000 | 3700 | 5000 |
| SHI$_{0/100}$ | 6.3 | 6.9 | 17 | 12 | 19 |
| G'$_{5kP2}$ [Pa] | 1400 | 1545 | 2220 | 1940 | 2170 |

TABLE 6

MD lab materials, analysis data

| Material | M1 | M2 | M3 | M4 | M5 | M6 | CM1 | CM2 | CM3 |
|---|---|---|---|---|---|---|---|---|---|
| Density [kg/m³] | 937 | 935 | 931 | 936 | 933 | 934 | 936 | 933 | 938 |
| MFR$_2$ [g/10 min] | 0.62 | 1.2 | 1.0 | 0.41 | 3.1 | 3.4 | 0.84 | 5.6 | 10.9 |
| $\eta_0$ [Pas] | 18000 | 9680 | 11100 | 23300 | 7600 | 8500 | 18000 | 8000 | 4700 |
| SHI$_{0/100}$ | 3.0 | 3.5 | 4.0 | 4.4 | 14 | 10 | 5.1 | 20 | 15 |
| G'$_{5kPa}$ [Pa] | 866 | 983 | 1020 | 1040 | 2050 | 1850 | 1190 | 1960 | 2130 |

TABLE 7

LLD lab materials, analysis data

| Material | L1 | L2 | L3 | L4 | L5 | L6 | CL1 | CL2 | CL3 |
|---|---|---|---|---|---|---|---|---|---|
| Density [kg/m²] | 928 | 921 | 929 | 928 | 927 | 929 | 926 | 922 | 923 |
| MFR$_2$ [g/10 min] | 1.2 | 1.3 | 0.68 | 0.47 | 3.4 | 3.1 | 7.8 | 0.57 | 0.33 |
| $\eta_0$ [Pas] | 11300 | 10800 | 16600 | 19800 | 8000 | 9300 | 2400 | 23400 | 34500 |
| SHI$_{0/100}$ | 3.4 | 5.3 | 4.1 | 3.1 | 10 | 11 | 6.0 | 3.7 | 3.8 |
| G'$_{5kPa}$ [Pa] | 913 | 1300 | 1020 | 854 | 1850 | 1920 | 1470 | 995 | 985 |

TABLE 8

LLD pilot materials, analysis data

| Material | L7 | L8 | L9 | L12 | L13 | L14 | L15 | L16 | CL4 |
|---|---|---|---|---|---|---|---|---|---|
| Density [kg/m³] | 925 | 919 | 921 | 915 | 920 | 920 | 915 | 918 | 920 |
| MFR$_2$ [g/10 min] | 0.75 | 0.42 | 0.70 | 0.82 | 1.5 | 1.5 | 1.2 | 1.4 | 1.2 |
| $\eta_0$ [Pas] | 11900 | 20100 | 13700 | 10000 | 8340 | 7840 | 8940 | 9130 | 9940[1] |
| SHI$_{0/100}$ | 3.4 | 34 | 3.7 | 4.0 | 6.0 | 5.0 | 7.0 | 9.0 | 4.62 |
| G'$_{5kPa}$ [Pa] | 898 | 855 | 890 | 973 | 1360 | 1290 | 1440 | 1610 | 1560 |

TABLE 8-continued

LLD pilot materials, analysis data

| Material | L7 | L8 | L9 | L12 | L13 | L14 | L15 | L16 | CL4 |
|---|---|---|---|---|---|---|---|---|---|

[1]: Viscosity at 1 kPa shear stress
[2]: $SHI_{1/100}$

REFERENCE EXAMPLE 1

A number of commercially available materials were evaluated. The results are shown in Table 10. Samples RL1, RL2, RL6 and RL7 are commercially available unimodal metallocene materials. Sample RL3 is a commercially available unimodal material produced using a Ziegler-Natta catalyst. Sample RL4 is a commercially available bimodal material produced using a Ziegler-Natta catalyst. Sample RH1 is a blend of unimodal metallocene material and a unimodal Ziegler-Natta material. Sample RL5 is a unimodal metallocene material produced in a loop reactor.

TABLE 9

Reference materials

| Sample | RL1 | RL2 | RL3 | RL4 | RH1 | RL5 | RL6 | RL7 |
|---|---|---|---|---|---|---|---|---|
| Density [kg/m$^3$] | 919 | 918 | 919 | 923 | 940 | 920 | 923 | 917 |
| MFR$_2$ [g/10 min] | 1.0 | 0.9 | 1.1 | 0.76[1] | 2.6[1] | 3.4 | 2.8 | 0.95 |
| $\eta_0$ [Pas] | 9360 | 9400 | 13500 | — | 17900[2] | 3760 | 2710 | 10900 |
| SHI$_{0/100}$ | 3.4 | 3.2 | 5.2[4] | — | 9.1[3] | 1.5 | 1.5 | 4.0 |
| G'$_{5kPa}$ [Pa] | 1003 | 965 | 1360 | — | 1850 | 306 | 325 | 1090 |

Notes:
[1]: MFR$_5$
[2]: Viscosity at 1 kPa shear stress
[3]: $SHI_{1/100}$
[4]: $SHI_{0/50}$

EXAMPLE 6

A cast film was made from high density samples H1–H4, CH1 and RH1 according to the procedure presented above. The results are shown in Table 10.

The table shows that the materials prepared according to the invention H1–H4 exhibit good (H1–H2) or acceptable (H3–H4) mechanical properties, as indicated by the high puncture values, combined with good optical properties, as indicated by the high gloss. While the comparative material CH1 and the reference material RH1 have equally good puncture resistance, they have a clearly inferior gloss compared to the inventive materials.

TABLE 10

HD materials, lab cast film data

| Material | H1 | H2 | H3 | H4 | CH1 | RH1 |
|---|---|---|---|---|---|---|
| Film thickness [μm] | 37 | 36 | 40 | 36 | 32 | 48 |
| Tensile strength MD [MPa] | 50.0 | 47.0 | 25.0 | 30.0 | 46.0 | 54.6 |
| Tensile strength TD [MPa] | 26.0 | 35.0 | 22.0 | 22.0 | 30.0 | 29.2 |
| Puncture energy [J] | 0.9 | 1.4 | 0.6 | 0.5 | 0.9 | 1.4 |
| Puncture/thickness | 0.024 | 0.039 | 0.015 | 0.014 | 0.028 | 0.029 |
| Gloss | 96 | 96 | 90 | 90 | 81 | 61 |

EXAMPLE 7

The procedure of Example 6 was repeated, but now the medium density samples M1–M6 and CM1–CM3 were used as starting materials. The results are shown in Table 11.

The table shows that the inventive materials again have a better combination of mechanical and optical properties than the comparative materials. A look at Table 6 reveals that a too low molecular weight (low viscosity) results in poor mechanical properties (CM2). It also shows that if the molecular weight is too high (or the molecular weight distribution too broad), the optical properties will suffer (CM1 and CM3).

TABLE 11

MD materials, lab cast film data

| Material | M1 | M2 | M3 | M4 | M5 | M6 | CM1 | CM2 | CM3 |
|---|---|---|---|---|---|---|---|---|---|
| Thickness [μm] | 34 | 40 | 41 | 37 | 38 | 34 | 35 | 28 | 30 |
| TS MD [Mpa] | 85 | 49 | 62 | 67 | 34 | 40 | 56 | 30 | 33 |
| TS TD [Mpa] | 35 | 35 | 35 | 32 | 26 | 27 | 32 | 24 | 27 |
| Puncture [J] | 2.1 | 1.3 | 1.3 | 1.1 | 1.1 | 1.2 | 0.9 | 0.5 | 0.8 |
| Puncture/Thickness | 0.032 | 0.033 | 0.032 | 0.030 | 0.029 | 0.035 | 0.026 | 0.018 | 0.027 |
| Gloss | 97 | 128 | 104 | 90 | 100 | 114 | 72 | 112 | 84 |

EXAMPLE 8

The procedure of Example 6 was repeated, but now the low density samples L1–L6 and CL1–CL3 were used as starting materials. The results are presented in Table 12.

TABLE 12

LLD materials, lab cast film data

| Material | L1 | L2 | L3 | L4 | L5 | L6 | CL1 | CL2 | CL3 |
|---|---|---|---|---|---|---|---|---|---|
| Thickness [μm] | 34 | 30 | 36 | 51 | 30 | 29 | 27 | 37 | 39 |
| TS MD [Mpa] | 58 | 46 | 63 | 75 | 37 | 36 | 33 | 70 | 74 |
| TS TD [Mpa] | 36 | 28 | 32 | 43 | 32 | 30 | 26 | 42 | 44 |
| Puncture [J] | 1.4 | 1.2 | 1.6 | 2.2 | 1.2 | 1.3 | 0.9 | 1.5 | 1.6 |
| Puncture/Thickness | 0.041 | 0.040 | 0.044 | 0.043 | 0.040 | 0.045 | 0.033 | 0.041 | 0.041 |
| Gloss | 137 | 96 | 101 | 108 | 97 | 98 | 101 | 76 | 77 |

TABLE 13

Reference materials lab cast film data

| Material | RL1 | RL2 | RL3 | RL4 | RL5 | RL6 |
|---|---|---|---|---|---|---|
| Thickness [μm] | 42 | 43 | 36 |  | 77 | 88 |
| TS MD [MPa] | 59 | 49 | 53 | 22 |  |  |
| TS TD [MPa] | 44 | 32 | 29 | 20 |  |  |
| Tear MD [N] |  |  |  | 0.15 | 5.1 | 3.5 |
| Puncture [J] | 1.8 | 2 | 1.6 | 1.1 | 4.0 | 5.0 |
| Puncture/thickness | 0.043 | 0.047 | 0.044 |  | 0.052 | 0.057 |
| Gloss | 126 | 139 | 134 |  |  |  |

EXAMPLE 9

Materials L7–L9, RL3 and RL4 were blown to film on a Windmöller & Hölscher film line using a 200 mm die and 2.3 mm die gap. The blow-up ratio was 2.5:1. The frost-line height was 450 mm and the film thickness 40 μm. The film data is shown in Table 14.

To improve processability, a fluoroelastomer was added into samples L7 and L8 so that the concentration of the fluoroelastomer was 300 ppm. The thus obtained samples are shown in Table 14 as L10 and L11, respectively.

TABLE 14

Blown film data

| Material | L7 | L8 | L9 | L10 | L11 | L12 | L15 | RL3 | RL4 |
|---|---|---|---|---|---|---|---|---|---|
| Melt temp., °C. | 258 | 267 | 257 | 254 | 263 |  |  |  |  |
| CoF, inside | 0.64 | 0.84 | 0.7 | 0.7 | 0.78 |  |  | 1.32 |  |
| Outside | 0.68 | 0.82 | 0.78 | 0.74 | 0.89 |  |  | 2.06 |  |
| TS MD, MPa | 33 | 47 | 35 | 41 | 39 | 21 | 13 | 35 |  |
| TS TD, Mpa | 36 | 41 | 37 | 41 | 46 | 26 | 25 | 30 |  |
| Tear MD, N | 3.1 | 2.9 | 3.4 | 2.7 | 2.5 | 3.0 | 2.3 | 2.1 |  |
| Dart drop, g | 171 | 1023 | 478 | 176 | 1203 | 830 | 178 | 103 | 350 |
| Haze | 17 | 16 | 17 | 12 | 14 | 37 | 17 | 9 | 65 |
| Gloss | 83 | 72 | 72 | 99 | 104 | 32 | 65 | 111 | 15 |
| Melt fracture | Slight | Yes | Some | No | Slight | No | No | Some | No |

The table shows that the film made of the inventive material has almost similar optical properties (slightly higher haze and lower gloss) than the film made of unimodal Ziegler-Natta material (RL3) but significantly improved mechanical properties (higher dart drop and tear strength). Compared to a bimodal Ziegler-Natta material (RL4), the film made of the inventive material has significantly improved optical properties and at least comparable mechanical properties. The processability (of which the absence of melt fracture is a useful measure; alternatively, melt temperature also measures processability, high melt temperature indicating poor processability) of the inventive materials is comparable to that of the unimodal Ziegler-Natta material but inferior to bimodal Ziegler-Natta material. A unimodal metallocene based material was not run in this experiment, but earlier experience has shown that this kind of material has reasonable optical properties combined with good mechanical properties but it is very difficult to process.

EXAMPLE 10

Figure 1:
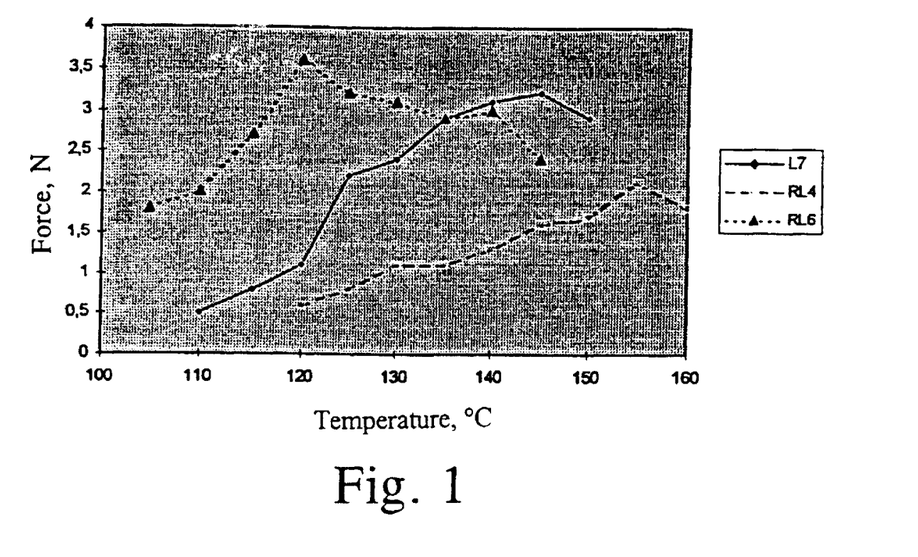
FIG. 1 presents the heat sealing behaviour for different materials.

Materials L7, RL4 and RL6 were put to a hot tack test to measure the sealability. Two film samples were pressed together at elevated temperature. The sealing time was 0.2 seconds, the lag time was 0.1 seconds and the sealing pressure was 1 N/mm². The force required to break the seal was then measured. The data is shown in FIG. 1. It indicates that the film made of inventive material L7 has a similar heat sealing behaviour as the one made of unimodal metallocene material RL6. Both these are superior to unimodal Ziegler material RL4 (higher force, as well as lower sealing temperature). The difference between the sealing temperatures of L7 and RL6 is due to the fact that L7 has a higher density compared with RL6 and thus the sealing temperature is higher.

While L7 has a sealing behaviour similar to that of RL6, its processability is similar to RL4, which is superior to the processability of RL6. Thus, the invention combines the sealing performance of the metallocene materials to the processability of the Ziegler materials.

EXAMPLE 11

Materials L14 and L16 and a comparative material produced with a Ziegler catalyst, CL4, were blown to film on a Reifenhäuser film line using a 150 mm die and 1.5 mm die gap. The blow-up ratio was 3.0:1. The film thickness was 25 μm. The film data is shown in Table 15.

The table shows that the inventive materials L14 and L16 have superior mechanical properties (same tensile strength with a thinner film, and higher dart drop with equal film thickness) compared with the comparative material CL4. Also, the optical properties are slightly better.

TABLE 15

| | Blown film data | | |
|---|---|---|---|
| Material | L14 | L16 | CL4 |
| TS MD, Mpa | 39 | 37 | 32* |
| TS TD, Mpa | 34 | 31 | 39* |

TABLE 15-continued

| | Blown film data | | |
|---|---|---|---|
| Material | L14 | L16 | CL4 |
| Tear MD, N | 1.4 | 1.4 | |
| Dart drop, g | 118 | 131 | 69 |
| Haze | 6.7 | 7.7 | 9.8 |
| Gloss | 110 | 98 | |
| Melt fracture | No | No | No |

*measured from 40 μm film

EXAMPLE 12

Figure 2:
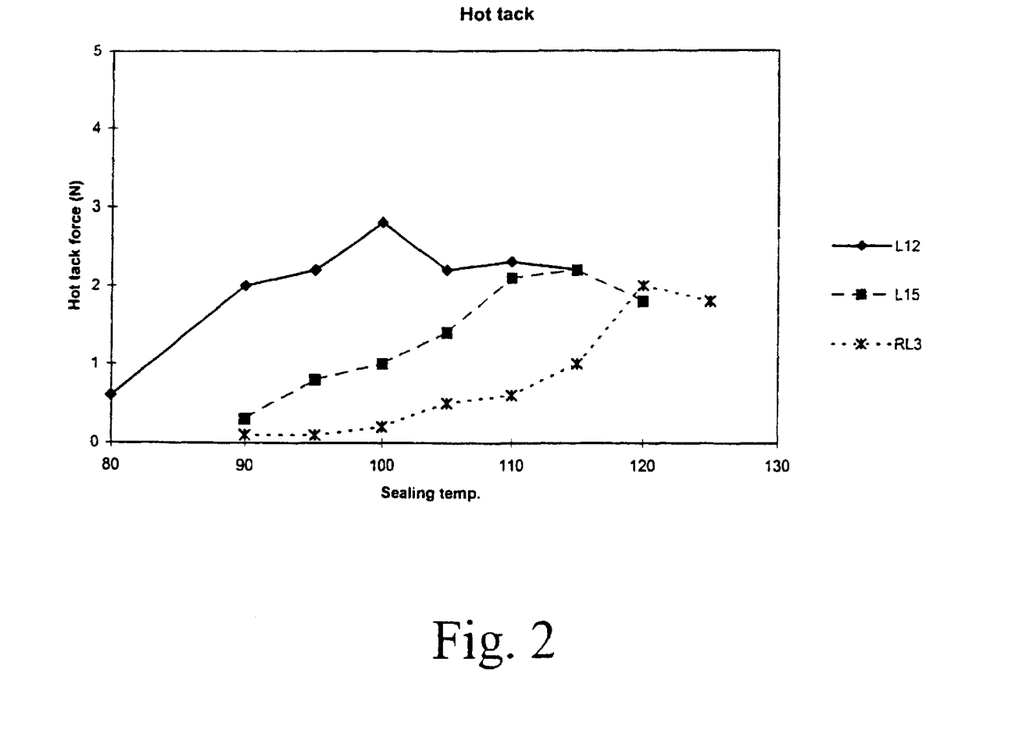
FIG. 2 presents the heat sealing properties for different materials.

The procedure of Example 10 was repeated, except that the sealing time was 0.5 seconds, the tag time 0.1 seconds, sealing pressure was 90 N for a specimen width 15 mm. The film thickness was 40 μm. The results are shown in FIG. 2. The samples that were tested were L12, L15 and RL3. The results indicated that RL3 had poor hot tack and it had a reasonable processability. L12 and L15 had a good processability, and L12 had interesting hot tack properties (low sealing temperature) while L15 had a reasonable hot tack.

What is claimed is:

1. A process for producing polyethylene compositions comprising the steps of subjecting ethylene and, optionally, hydrogen and/or comonomers to polymerization or copolymerization reactions in a multistage polymerization sequence of successive polymerization stages, operating at least one polymerization stage essentially in the absence of hydrogen so as to prepare a high molecular weight polymer component, carrying out the polymerization reactions in the presence of a single-site catalyst, the active complex of which is a siloxy-substituted bis-indenyl zirconium dihalide or has the general formula $$(X_1)(X_2)Hf(Cp-R_1)(Cp-R_2),\qquad(I)$$

wherein $X_1$ and $X_2$ are either same or different and are selected from a group containing halogen, methyl, benzyl, amido or hydrogen, Hf is hafnium, Cp is a cyclopentadienyl group, and $R_1$ and $R_2$ are either the same or different and are either linear or branched hydrocarbyl groups containing 1–10 carbon atoms, to form a polyethylene composition comprising a low molecular weight average component with $MFR_2$ of at least 10 g/10 min and a density higher that the overall density of the composition, a high molecular weight average component, said polyethylene composition having a melt flow rate in the range $MFR_2=0.1–5.0$ g/10 min and a density of 905–960 kg/m³.

2. A process for producing polyethylene compositions comprising the steps of subjecting ethylene and, optionally, hydrogen and/or comonomers to polymerization or copolymerization reactions in a multistage polymerization sequence of successive polymerization stages, operating at least one polymerization stage essentially in the absence of hydrogen so as to prepare a high molecular weight polymer component, carrying out the polymerization reactions in the presence of a single-site catalyst, the active complex of which is a siloxy-substituted bis-indenyl zirconium dihalide or has the general formula $$(X_1)(X_2)Hf(Cp-R_1)(Cp-R_2), \qquad (I)$$

wherein
$X_1$ and $X_2$ are either same or different and are selected from a group containing halogen, methyl, benzyl or hydrogen,
Hf is hafnimum,
Cp is a cyclopentadienyl group, and
$R_1$ and $R_2$ are either the same or different and are either linear or branched hydrocarbyl groups containing 1–10 carbon atoms,
to form a polyethylene composition comprising
a low molecular weight average component with $MFR_2$ of at least 10 g/10 min and a density higher that the overall density of the composition,
a high molecular weight average component,
said composition having a melt flow rate in the range $MFR_2$=0.1–5.0 g/10 min and a density of 915–960 kg/m$^3$.

3. The process according to claim 1 or 2, comprising
subjecting ethylene and, optionally, hydrogen and/or comonomers to a first polymerization or copolymerization reaction in the presence of the single site catalyst in a first reaction zone or reactor to produce a polymer having a MFR of 10 g/10 min or more,
recovering the first polymerization product from the first reaction zone,
feeding the first polymerization product to a second reaction zone or reactor,
feeding additional ethylene and, optionally, comonomers to the second reaction zone,
subjecting the additional ethylene and optionally additional monomer(s) to a second polymerization reaction in the presence of the single-site catalyst and the first polymerization product to produce a second polymerization product having a $MFR_2$ of less than 5 g/10 min, and
recovering the combined polymerization product from the second reaction zone.

4. The process according to claim 1, wherein the active complex of the catalyst is bis-(n-butyl cyclopentadienyl) hafnium dihalide.

5. The process according to claim 1, wherein the catalyst is supported on silica.

6. The process according to claim 1, wherein the catalyst is used together with an aluminiumoxane cocatalyst.

7. The process according to claim 6, wherein the cocatalyst is selected from the group consisting of methyl aluminiumoxane (MAO), tetraisobutyl aminimiumoxane (TIBAO) and hexaisobutyl aluminiumoxane (HIBAO).

8. The process according to claim 1, wherein 30 to 70%, of the ethylene homopolymer or copolymer is produced at conditions suitable to provide a polymer having a $MFR_2$ of 10 g/10 min or more and 70 to 30%, of the ethylene homopolymer or copolymer is produced at conditions suitable to provide a polymer having a $MFR_2$ of less than 5 g/10 min.

9. The process according to claim 1, wherein essentially no fresh catalyst is added to the reactors other than the first reactor.

10. The process according to claim 1, wherein the process is carried out in a polymerization reactor cascade comprising a loop reactor and a gas phase reactor, in that order.

11. The process according to claim 1, wherein the process is carried out in a polymerization reactor cascade comprising two or more gas phase reactors.

12. The process according to claim 1, wherein a separation stage is employed between the two reaction stages.

13. The process according to claim 8, wherein 40 to 60% of the ethylene homopolymer or copolymer is produced at conditions suitable to provide a polymer having an $MFR_2$ of 10 g/10 min or more and 60 to 40% of the ethylene homopolymer or copolymer is produced at conditions suitable to provide a polymer having an $MFR_2$ of less than 5 g/10 min.

* * * * *